United States Patent
Watanabe et al.

(10) Patent No.: US 10,464,551 B2
(45) Date of Patent: Nov. 5, 2019

(54) TRAVELING SUPPORT DEVICE

(71) Applicant: AISIN SEIKI KABUSHIKI KAISHA, Kariya-shi, Aichi-ken (JP)

(72) Inventors: Kazuya Watanabe, Anjo (JP); Yoji Inui, Ama-gun (JP); Naotaka Kubota, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 260 days.

(21) Appl. No.: 15/594,072

(22) Filed: May 12, 2017

(65) Prior Publication Data

US 2018/0001887 A1 Jan. 4, 2018

(30) Foreign Application Priority Data

Jun. 30, 2016 (JP) ................... 2016-129704

(51) Int. Cl.
*B60W 30/02* (2012.01)
*B60G 17/0165* (2006.01)
(Continued)

(52) U.S. Cl.
CPC ....... *B60W 30/025* (2013.01); *B60G 17/0165* (2013.01); *B60G 17/0195* (2013.01); *B60G 17/01908* (2013.01); *B60W 10/04* (2013.01); *B60W 10/22* (2013.01); *B60W 30/182* (2013.01); *B60W 40/11* (2013.01);
(Continued)

(58) Field of Classification Search
CPC .. B60W 30/025; B60W 30/182; B60W 10/04; B60W 10/22; B60W 2520/26; B60W 2550/147; B60W 2710/22; B60W 2720/10; B60G 17/0165; B60G 17/01908; B60G 17/0195; B60G 2500/30; B60G 2400/204; B60G 2400/821
See application file for complete search history.

(56) References Cited

U.S. PATENT DOCUMENTS

| | | | | |
|---|---|---|---|---|
| 6,260,859 B1 * | 7/2001 | Dixon | ................... | B60G 17/005 280/5.514 |
| 7,380,800 B2 * | 6/2008 | Klees | ................. | B60G 17/0165 280/5.515 |
| 8,655,577 B2 * | 2/2014 | Stender | .............. | B60G 17/0155 701/1 |
| 2012/0158243 A1 | 6/2012 | Pupin et al. | | |

(Continued)

FOREIGN PATENT DOCUMENTS

JP 5-238313 A 9/1993
JP 6-000936 U 1/1994
(Continued)

*Primary Examiner* — Michael J Zanelli
(74) *Attorney, Agent, or Firm* — Sughrue Mion, PLLC

(57) ABSTRACT

A traveling support device includes: a comparing unit that compares a detection result based on an output value output from a sensor for detecting a state of a vehicle with a reference value stored in advance; and a controller that, when comparison by the comparing unit determines that the detection result is equal to or more than the reference value, switches a first control mode to a second control mode different from the first control mode with respect to at least one of a display control capable of switching display of information on the vehicle, a vehicle height control capable of switching a vehicle height with a vehicle height adjustment device of the vehicle, and a vehicle speed control capable of switching a speed limit value with a vehicle control device of the vehicle.

14 Claims, 5 Drawing Sheets

(51) Int. Cl.
- *B60G 17/019* (2006.01)
- *B60G 17/0195* (2006.01)
- *B60W 10/04* (2006.01)
- *B60W 10/22* (2006.01)
- *B60W 30/182* (2012.01)
- *B60W 40/11* (2012.01)

(52) U.S. Cl.
CPC .. *B60G 2400/204* (2013.01); *B60G 2400/821* (2013.01); *B60G 2401/21* (2013.01); *B60G 2500/30* (2013.01); *B60W 2420/54* (2013.01); *B60W 2420/62* (2013.01); *B60W 2520/10* (2013.01); *B60W 2520/26* (2013.01); *B60W 2550/147* (2013.01); *B60W 2710/22* (2013.01); *B60W 2720/10* (2013.01)

(56) References Cited

U.S. PATENT DOCUMENTS

| | | | |
|---|---|---|---|
| 2014/0288793 A1* | 9/2014 | Tran | B60G 17/0165 701/70 |
| 2015/0266467 A1* | 9/2015 | Mansur | B60W 10/06 701/22 |
| 2016/0009225 A1 | 1/2016 | Watanabe et al. | |
| 2016/0031444 A1* | 2/2016 | Fairgrieve | B22D 21/005 701/93 |
| 2016/0059700 A1 | 3/2016 | Watanabe et al. | |

FOREIGN PATENT DOCUMENTS

| | | |
|---|---|---|
| JP | 2016-021653 A | 2/2016 |
| JP | 2016-049868 A | 4/2016 |

* cited by examiner

TRAVELING SUPPORT DEVICE

CROSS REFERENCE TO RELATED APPLICATIONS

This application is based on and claims priority under 35 U.S.C. § 119 to Japanese Patent Application 2016-129704, filed on Jun. 30, 2016, the entire contents of which are incorporated herein by reference.

TECHNICAL FIELD

Embodiments disclosed herein relate to a traveling support device.

BACKGROUND DISCUSSION

In the related art, a system performing various supports to reduce the burden on a driver of a vehicle has been suggested. For example, there has been suggested a system which displays an image of a periphery of a vehicle on a display device inside a vehicle compartment or displays a notification screen when a road surface requiring a driver's attention during traveling is present. Further, there has been suggested a system which is capable of switching a setting of a vehicle to a setting for an irregular ground road when the vehicle travels on the irregular ground road. See, for example, JP Utility 06-000936A (Reference 1), JP 05-238313A (Reference 2), US 2012/0158243A (Reference 3), and JP 2016-049868A (Reference 4).

However, in the systems, the mode switching is a specification that is carried out by a driver (a user or an occupant) through, for example, a switch operation, and the driver may feel inconvenient with the switching during traveling. Especially, during the traveling on the irregular ground road or the like, it is required to support the driver to concentrate on the steering and not to carry out the mode switching accompanied by the switch operation or the like.

Thus, a need exists for a traveling support device which is not susceptible to the drawback mentioned above.

SUMMARY

A traveling support device according to an aspect of this disclosure includes: a comparing unit that compares a detection result based on an output value output from a sensor for detecting a state of a vehicle with a reference value stored in advance; and a controller that, when comparison by the comparing unit determines that the detection result is equal to or more than the reference value, switches a first control mode to a second control mode different from the first control mode with respect to at least one of a display control capable of switching display of information on the vehicle, a vehicle height control capable of switching a vehicle height with a vehicle height adjustment device of the vehicle, and a vehicle speed control capable of switching a speed limit value with a vehicle speed control device of the vehicle. According to this configuration, when the state of the vehicle, for example, entry into an irregular ground road is detected, the detection result is compared with the reference value so as to automatically switch at least one of the display control, the vehicle height control, and the vehicle speed control. As a result, even when the traveling state changes, the vehicle may travel in an appropriate control mode without causing a driver or the like to feel inconvenient with the mode switching.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of this disclosure will be described. In the embodiments described below, configurations, and actions, results, and effects resulting from the corresponding configurations are exemplary. The embodiments disclosed here may be implemented by configurations other than the configurations described in the embodiments below, and at least one of various effects based on the basic configurations and derivative effects therefrom may be obtained.

In the embodiments, a vehicle 1 equipped with a traveling support device (a traveling support system) may be, for example, an automobile using an internal combustion engine (not illustrated) as a driving source, that is, an internal combustion engine automobile, or an automobile using an electric motor (not illustrated) as a drive source, that is, an electric automobile or a fuel cell automobile or the like. Alternatively, the vehicle 1 may be, for example, a hybrid automobile using both the internal combustion engine and the electric motor as a driving source, or an automobile having another driving source. The vehicle 1 may be equipped with various transmissions, and various devices (e.g., systems or parts) required for driving the internal combustion engine or the electric motor. Further, the vehicle 1 is, for example, a vehicle capable of appropriately traveling on a so-called "off-road" (e.g., mainly, an unpaved irregular ground road), in addition to traveling on a so-called "on-road" (mainly, a paved road or its equivalent regular ground road). As for a driving method, the vehicle 1 may be a four-wheel drive vehicle which applies a driving force to all four wheels 3 to use the four wheels as drive wheels. Types, the number, a layout and others of devices related to the driving of the wheels 3 may be variously set. For example, the vehicle 1 may be a vehicle mainly useful for the traveling on the "on-road." Also, the driving method is not limited to the four-wheel driving method and may be, for example, a front-wheel driving method or a rear-wheel driving method.

Figure 1:
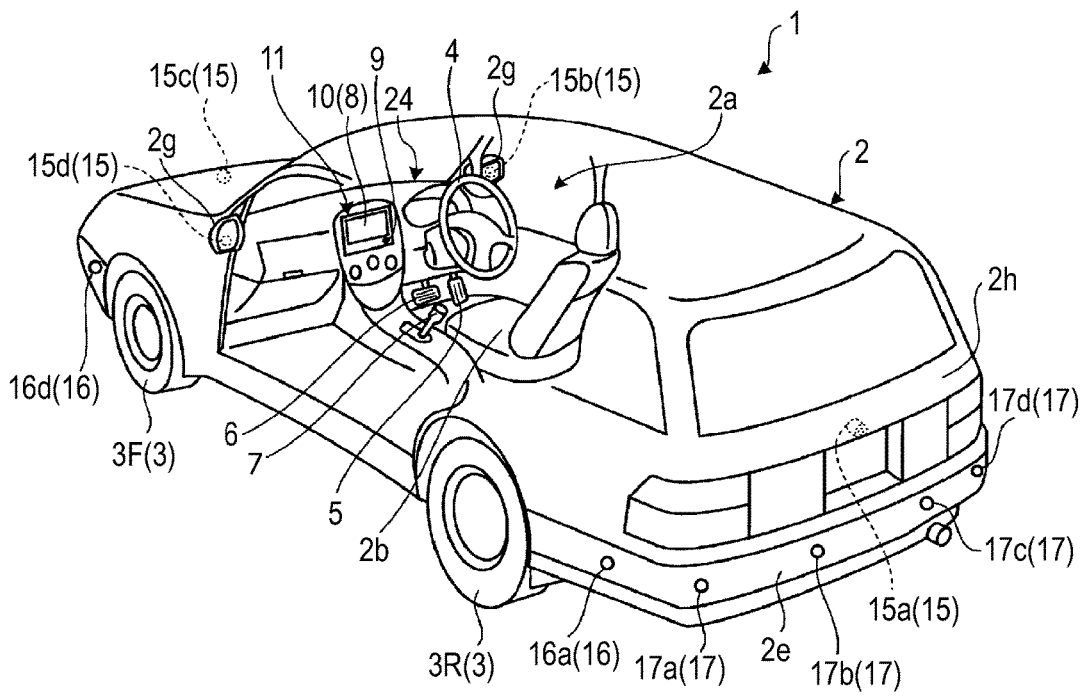
FIG. 1 is a perspective view illustrating an exemplary vehicle equipped with a traveling support device according to an embodiment, in which a vehicle compartment is partially viewed.

As exemplified in FIG. 1, a vehicle body 2 forms a vehicle compartment 2a in which an occupant (not illustrated) gets. Within the vehicle compartment 2a, a steering unit 4, an accelerating unit 5, a braking unit 6, a gear shift operating unit 7, and others are provided in a state of facing a seat 2b of a driver as an occupant. The steering unit 4 is, for example, a steering wheel protruding from a dashboard 24. The accelerating unit 5 is, for example, an accelerator pedal disposed under the feet of the driver. The braking unit 6 is, for example, a brake pedal disposed under the feet of the driver. The gear shift operating unit 7 is, for example, a shift lever protruding from a center console. In addition, the steering unit 4, the accelerating unit 5, the braking unit 6, the gear shift operating unit 7 and others are not limited to those described above.

Further, a display device 8 and an audio output device 9 are provided within the vehicle compartment 2a. The display device 8 is, for example, a liquid crystal display (LCD) or an organic electro-luminescent display (OELD). The audio output device 9 is, for example, a speaker. In addition, the display device 8 is covered with a transparent operation input unit 10 (e.g., a touch panel). The occupant may visually recognize an image which is displayed on a display screen of the display device 8 through the operation input unit 10. The occupant may perform an operation of touching, pressing, or moving the operation input unit 10 with a finger or the like at a position corresponding to an image displayed on the display screen of the display device 8 so as to execute operation input. The display device 8, the audio output device 9, the operation input unit 10, and others are provided in, for example, a monitor device 11 disposed at the center portion of the dash board 24 in the vehicle width direction, that is, in the left-and-right direction of the vehicle. The monitor device 11 may include an operation input unit (not illustrated) such as a switch, a dial, a joystick, or a push button. A separate audio output device (not illustrated) may be provided at a position different from the position of the monitor device 11, within the vehicle compartment 2a. A sound may be output from the audio output device 9 of the monitor device 11 and the separate audio output device. The monitor device 11 may also be used as a navigation system or an audio system.

Figure 2:
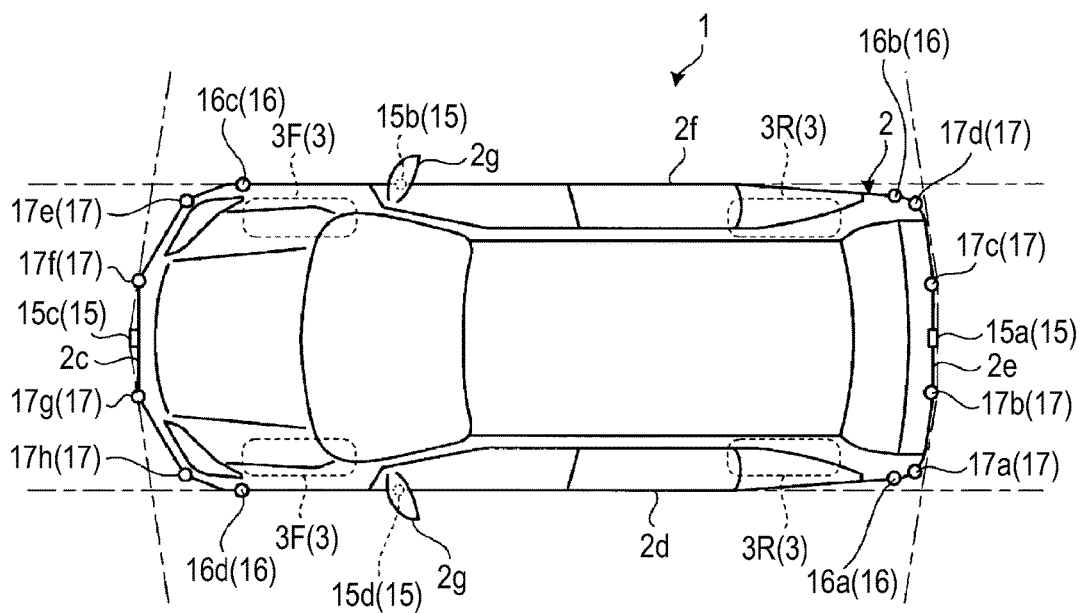
FIG. 2 is a plan view illustrating an example of the vehicle equipped with the traveling support device according to the embodiment.

As illustrated in FIGS. 1 and 2, the vehicle 1 is, for example, a four-wheeled vehicle, and includes two left/right front wheels 3F and two left/right rear wheels 3R. All the four wheels 3 may be configured to be steerable. As exemplified in FIG. 3, the vehicle 1 has a steering system 13 that steers at least two of the wheels 3. The steering system 13 has an actuator 13a and a torque sensor 13b. The steering system 13 is electrically controlled by an integrated electronic control unit (ECU) 30 or the like and operates the actuator 13a. The steering system 13 is, for example, an electric power steering system or a steer by wire (SBW) system. In addition, the torque sensor 13b detects, for example, a torque that the driver applies to the steering unit 4.

Further, the vehicle 1 has a brake system 18 that individually controls a braking state of each of the wheels 3. The brake system 18 is electrically controlled by the integrated ECU 30 or the like and operates an actuator 18a. The brake system 18 is, for example, an anti-lock brake system (ABS) for suppressing lock of the brake, a side slip prevention device (an electronic stability control (ESC)) for suppressing side slip of the vehicle 1 during cornering, an electric brake system for enhancing a braking force (performing brake assistance), or a brake by wire (BBW). The brake system 18 individually controls the braking force of each of the wheels 3 via the actuator 18a so as to apply the braking force to the entire vehicle 1. Further, the brake system 18 may perform the various controls by detecting a rotation difference of the respective wheels 3, based on outputs from wheel speed sensors 22 (22a, 22b, 22c, and 22d) provided for the wheels 3, respectively, to detect symptoms such as lock of the brake, idling of the wheels 3, and the side slip. A brake sensor 18b is, for example, a sensor that detects a position of a movable unit of the braking unit 6.

As described above, the integrated ECU 30 performs a control of the steering system 13, the brake system 18, and others, that is, a control related to the traveling of the vehicle 1, and furthermore, performs a management of various ECUs provided for respective functions, for example, a display ECU 32, an engine ECU 34, and a vehicle height adjustment ECU 36. That is, the integrated ECU 30 may perform the control of the display ECU 32, the engine ECU 34, the vehicle height adjustment ECU 36, and others based on acquired determination results. The details of the integrated ECU 30 will be described. In addition, the display ECU 32 mainly performs a control of the monitor device 11 (the display device 8) provided in the vehicle compartment 2a, and further, controls switching (a first control mode and a second control mode) of the display control. The engine ECU 34 mainly performs a control of an engine unit 50 as a vehicle speed control device. Further, the engine ECU 34 performs an output control (a speed regulation or a torque control) of the vehicle 1 and controls switching (the first control mode and the second control mode) of the vehicle speed control (setting of a regulated speed value). In addition, when an electric motor is included as a driving source of the vehicle 1, that is, when the vehicle 1 is an electric automobile, a motor ECU is provided, instead of the engine ECU 34. Further, when the vehicle 1 is a hybrid automobile, the motor ECU is provided, in addition to the engine ECU 34. In addition, the vehicle height adjustment ECU 36 mainly performs a control of absorber units 58 (58a, 58b, 58c, and 58d) as vehicle height adjustment devices through a hydraulic controller 56. Further, the vehicle height adjustment ECU 36 performs a control for adjusting the vehicle height of the vehicle 1 and controls switching (the first control mode and the second control mode) of the vehicle height control.

Figure 3:
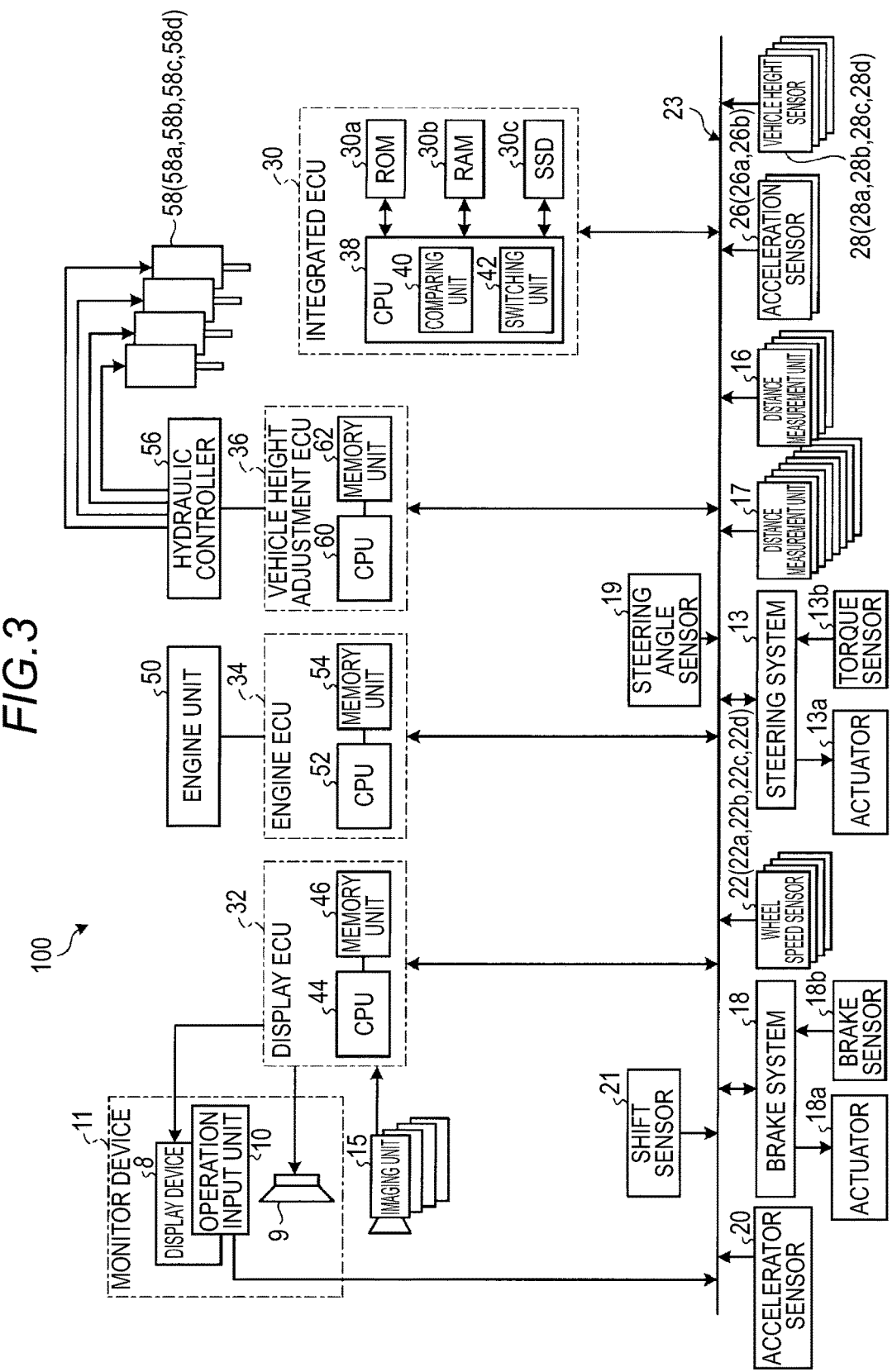
FIG. 3 is a block diagram illustrating an example of a traveling support system including the traveling support device according to the embodiment.

As exemplified in FIG. 3, in a traveling support system 100 (the driving support device), in addition to the integrated ECU 30, the display ECU 32, the engine ECU 34, the vehicle height adjustment ECU 36, the monitor device 11, the steering system 13, the brake system 18, and others, distance measurement units 16 and 17, a steering angle sensor 19, an accelerator sensor 20, a shift sensor 21, the wheel speed sensors 22, acceleration sensors 26, vehicle height sensors 28, and others are electrically connected to each other through an in-vehicle network 23 as an electric communication line. The in-vehicle network 23 is configured as, for example, a controller area network (CAN). The integrated ECU 30 may control the steering system 13, the brake system 18, and others by sending control signals through the in-vehicle network 23. In addition, the integrated ECU 30 may receive detection results of the torque sensor 13b, the brake sensor 18b, the steering angle sensor 19, the distance measurement unit 16, the distance measurement unit 17, the accelerator sensor 20, the shift sensor 21, the wheel speed sensors 22, the acceleration sensors 26, the vehicle height sensors 28, and others, or operation signals from the operation input unit 10 and others, through the in-vehicle network 23.

As exemplified in FIG. 2, the vehicle body 2 is provided with, for example, four imaging units 15a to 15d as plural imaging units 15. The imaging units 15 are, for example, digital cameras each equipped with an imaging element such as a charge coupled device (CCD) or a CMOS image sensor (CIS). The imaging units 15 may output video data (captured image data) at a predetermined frame rate. Each of the imaging units 15 includes a wide angle lens or a fish-eye lens, and may capture an image in a range of, for example, 140° to 220° in the horizontal direction. In addition, the optical axis of each of the imaging units 15 may be set to be directed obliquely downward. Accordingly, the imaging units 15 sequentially image peripheral circumstances of the vehicle 1 (environments outside the vehicle) including a road surface on which the vehicle 1 is movable, a water surface during water crossing traveling (in-water traveling), and peripheral circumstances (e.g., an uneven state of a road surface, a distance to an uneven portion, presence/absence of water, and the state of a water surface) or objects (as obstacles, e.g., rocks, trees, people, bicycles, and vehicles) thereof, and outputs the peripheral circumstances as captured image data.

The imaging unit 15a is disposed on, for example, an end portion 2e of the rear side of the vehicle body 2, and mounted on the wall below the rear window of a door 2h of the rear hatch. The imaging unit 15b is disposed on, for example, an end portion 2f of the right side of the vehicle body 2, and mounted on a right door mirror 2g. The imaging unit 15c is disposed on, for example, an end portion 2c of the front side of the vehicle body 2, that is, the front side of the vehicle in the front-and-rear direction of the vehicle, and mounted on, for example, the front bumper or the front grille. The imaging unit 15d is disposed on, for example, an end portion 2d of the left side of the vehicle body 2, that is, the left side of the vehicle in the vehicle width direction, and mounted on a left door mirror 2g. The display ECU 32 may execute an arithmetic processing or an image processing based on captured image data obtained from the plural imaging units 15, to generate an image having a relatively wide viewing angle or a virtual bird's eye view image in which the vehicle 1 is viewed from the upper side. Further, the display ECU 32 may perform an arithmetic processing or an image processing for data of a wide angle image obtained from the imaging units 15, to generate an image from which a specific area has been cut or image data representing only a specific area. Further, the display ECU 32 may convert the captured image data into virtual image data which seems to have been imaged at a virtual view point different from a view point where the imaging units 15 captured an image (view point conversion). For example, the display ECU 32 may convert the captured image data into virtual image data representing a bird's eye view image which seems to have been obtained by looking down the vehicle 1 from a bird's-eye view or virtual image data representing a side view image which seems to face the side surface of the vehicle 1 from a position apart from the corresponding vehicle 1. By displaying the acquired image data on the display device 8, the display ECU 32 provides periphery monitoring information for confirming safety of the right or left side periphery of the vehicle 1, the water level during the water crossing traveling to be described later, or safety of a periphery of the vehicle 1 overlooked from the sky.

In addition, upon the water crossing traveling, the display ECU 32 may display a part of the vehicle body 2 along with the state of the water surface to display a relationship between the vehicle 1 and the water surface, and may perform a water crossing traveling support. In this case, the display ECU 32 may display an image in which a water level limit line, a water level reference line or the like is superimposed on a part of the vehicle 1, for example, on the side surface of the vehicle body 2 as described later. Further, the display ECU 32 may perform the traveling support by identifying a lane marking line or the like indicated on the road surface around the vehicle 1 or a parking support by detecting (extracting) a parking section from the captured image data provided from the imaging units 15.

In addition, as exemplified in FIGS. 1 and 2, the vehicle body 2 is provided with, for example, four distance measurement units 16a to 16d and eight distance measurement units 17a to 17h as the plural distance measurement units 16 and 17. The distance measurement units 16 and 17 are, for example, sonars that emit ultrasonic waves and identify reflected waves. The sonars may be called sonar sensors, ultrasonic detectors, or ultrasonic sonars. In the present embodiment, the distance measurement units 16 and 17 are provided at low positions of the vehicle 1 in the vehicle height direction, for example, on the front and rear bumpers, and may detect an obstacle around the vehicle 1 and measure the distance to the obstacle. Further, the distance measurement units 16 and 17 may be used as sensors for determining whether the vehicle 1 is in a state of entering water (water crossing traveling). As described above, since the distance measurement units 16 and 17 are provided on the front and rear bumpers which are the low positions of the vehicle 1 in the vehicle height direction, the distance measurement units 16 and 17 are submerged into water at a relatively early stage before reaching the height at which the water crossing traveling becomes disabled due to the water level (the height on which the water level limit line is superimposed), upon the water crossing traveling. For example, when the distance measurement units 16 and 17 are submerged into water, the receiving state of the reflected waves becomes unstable, and thus, operation errors occur. Accordingly, when the vehicle 1 enters a stream or marsh, and thus, is submerged into water, error signals may be output from the plural distance measurement units 16 and 17 almost at the same time. For example, when the vehicle 1 enters a stream or marsh while traveling forward, the distance measurement units 17e, 17f, 17g, and 17h are submerged into water and output error signals, almost at the same time. Subsequently, the distance measurement units 16c and 16d output error signals. Similarly, when the vehicle 1 enters a stream or marsh while traveling backward, the distance measurement units 17a, 17b, 17c, and 17d are submerged into water and output error signals, almost at the same time. Subsequently, the distance measurement units 16a and 16b output error signals. That is, based on the outputting state of the error signals from the distance measurement units 16 and 17, information for determining whether the vehicle 1 is in the state of the water crossing traveling may be obtained. In a case where the vehicle 1 completes the water crossing traveling (in a case where the vehicle 1 gets on the ground), when the vehicle 1 escapes from the stream or marsh while traveling forward, the distance measurement units 17e, 17f, 17g, and 17h are restored almost at the same time, and subsequently, the distance measurement units 16c and 16d are restored. Further, when the vehicle 1 continues to get on the ground, the distance measurement units 16a and 16b are restored, and the distance measurement units 17a, 17b, 17c, and 17d are finally restored almost at the same time. In this way, when all the distance measurement units 16 and 17 are restored, information for determining that the vehicle 1 has escaped from the water crossing traveling (completely got on the ground) may be obtained. In addition, the distance measurement units 16 and 17 are configured to have a water-proof structure so as not to undergo damages or the like by the submersion into water.

The steering angle sensor 19 is, for example, a sensor that detects a steering amount of the steering unit 4 such as the steering wheel. The integrated ECU 30 performs the various controls by acquiring a steering amount of the steering unit 4 applied by the driver, a steering amount of each of the wheels 3 upon automatic steering, and others from the steering angle sensor 19. The accelerator sensor 20 is, for example, a sensor that detects a position of a movable unit of the accelerating unit 5, and detects a size of the acceleration required by the driver, a size of the maintaining speed, and others. The wheel speed sensors 22 are provided in the wheels 3, respectively, to detect a rotation amount of each of the wheels 3 or the number of rotations per unit time, and outputs the number of wheel speed pulses indicating the detected number of rotations as a detection value. The integrated ECU 30 calculates a vehicle speed or a movement amount of the vehicle 1 based on the detection values acquired from the wheel speed sensors 22, and performs the various controls. In addition, when calculating the vehicle speed of the vehicle 1 based on the detection values of the vehicle speed sensors 22 (22a, 22b, 22c, and 22d), the integrated ECU 30 determines the vehicle speed of the vehicle 1 based on the speed of one of the four wheels 3 which has the smallest detection value, and performs the various controls. In addition, when one of the four wheels 3 has a large detection value in comparison with those of the other wheels 3, for example, when the number of rotations per unit time period (unit time or unit distance) of one of the four wheels 3 is as large as or larger than a predetermined number in comparison with those of the other wheels 3, the integrated ECU 30 regards that the corresponding wheel 3 is in a slipping state (an idling state), and performs the various controls. The shift sensor 21 is, for example, a sensor that detects a position of a movable unit of the gear shift operating unit 7. The engine ECU 34 controls the vehicle speed or the acceleration state of the vehicle 1 by controlling a fuel injection amount or an intake air amount in the engine unit 50 according to the detection value of the accelerator sensor 20, the detection values of the wheel speed sensors 22 (22a, 22b, 22c, and 22d), the detection value of the shift sensor 21 and others.

The vehicle 1 is provided with two acceleration sensors 26 (26a and 26b). When the vehicle 1 is equipped with the ESC, the acceleration sensors 26 (26a and 26b) previously equipped in the ESC are used. The acceleration sensor 26a detects, for example, the acceleration of the vehicle 1 in the left-and-right direction, and the acceleration sensor 26b detects, for example, the acceleration of the vehicle 1 in the front-and-rear direction. The integrated ECU 30 calculates the inclination (roll angle) of the vehicle 1 in the left-and-right direction or the inclination (pitch angle) of the vehicle 1 in the front-and-rear direction based on the detection values of the acceleration sensors 26a and 26b.

The vehicle height sensors 28 are connected to a suspension arm (e.g., a lower arm) that constitutes a suspension connecting the vehicle body 2 and the wheels 3 to each other, and detect a vertical displacement amount between the suspension arm and the vehicle body 2. In addition, as the vehicle height sensors 28, a type which directly measures the distance from the road surface by ultrasonic waves or laser may be used. The vehicle height adjustment ECU 36 controls the hydraulic controller 56 and controls an expansion/contraction operation of each of the absorber units 58 (58a, 58b, 58c, and 58d), based on the detection values of the vehicle height sensors 28. For example, when a loading amount of the vehicle 1 or the number of occupants changes, the vehicle height changes by the weight. However, by controlling the expansion/contraction state of the absorber units 58, the vehicle height of the vehicle 1 may be controlled to be an almost constant height. In addition, since the absorber units 58 may change the vehicle height by the vehicle speed of the vehicle 1, stable traveling according to the vehicle speed may be implemented. In addition, the absorber units 58 may lower the vehicle height when an occupant gets on/off or adjust the height of the baggage loading platform to load/unload a baggage, and may facilitate the getting on/off act and the loading/unloading work. In addition, when there exists an uneven portion (e.g., a rock, a curb stone, and a dent) on the road surface, the absorber units 58 appropriately change the vehicle heights of the wheels 3, respectively, so as to avoid that the vehicle 1 is extremely inclined or the bottom portion of the vehicle body becomes in contact with the road surface, and thus, the traveling becomes impossible.

The expansion/contraction state of the absorber units 58 is controlled by a working fluid fed by the hydraulic controller 56. The hydraulic controller 56 includes a hydraulic pump driven by, for example, an electric motor. The hydraulic controller 56 pumps the working fluid from a reservoir tank and ejects the working fluid to supply the working fluid to each of the absorber units 58 through a valve provided in each of the wheels 3. As a result, the internal pressures of the absorber units 58 are increased, and the absorber units 58 are expanded so that the vehicle height of the vehicle 1 may be increased. Meanwhile, when the working fluid is discharged from the absorber units 58 via the valves and returned to the reservoir tank of the hydraulic controller 56, the internal pressures of the absorber units 58 are decreased, and the corresponding absorber units 58 are contracted so that the vehicle height of the vehicle 1 may be lowered.

The configurations, arrangements, electrical connection forms, and others of the various sensors and actuators described above are exemplary and may be variously set (modified).

The integrated ECU 30 includes a central processing unit (CPU) 38 and a memory device (a memory unit) such as a read only memory (ROM) 30a, a random access memory (RAM) 30b, or a solid state drive (SSD; flash memory) 30c. The CPU 38 includes, for example, a vehicle control module for controlling the steering system 13 and the brake system 18 as described above. Further, the CPU 38 includes a module for switching the control state of the vehicle 1 from the first control mode suitable for the traveling on the regular ground road to the second control mode suitable for the traveling on the irregular ground road or switching the second control mode to the first control mode, by controlling the other ECUs such as the display ECU 32, the engine ECU 34, and the vehicle height adjustment ECU 36. In addition, the regular ground road is, for example, a paved road surface or its equivalent road surface, and a road surface called a so-called "on-road," and the first control mode may be a control mode for the "on-road." Meanwhile, the irregular ground road is, for example, an unpaved road surface on which many uneven portions are present, or a road surface including, for example, a sandy ground, marsh, shallow stream or swamp, and a road surface called a so-called "off-road," and the second control mode may be a control mode for the "off-road."

The CPU 38 of the integrated ECU 30 includes, for example, a comparing unit 40 and a switching unit 42 (a controller) as modules for automatically switching the first control mode and the second control mode to each other. The comparing unit 40 compares the detection results output from the sensors (e.g., the wheel speed sensors 22, the acceleration sensors 26, and the vehicle height sensors 28) that detect the state of the vehicle 1, with a reference value stored in advance in the memory unit such as the ROM 30*a* or the SSD 30*c*. The reference value may include, for example, a threshold value to be compared with the detection results or a value of the number of times that becomes equal to or more than the threshold value within a predetermined time period (e.g., a predetermined time or a predetermined traveling distance). When the detection results become equal to or more than the reference value as a result of the comparison by the comparing unit 40, the switching unit 42 switches the control of the vehicle 1 from the first control mode to the second control mode different from the first control mode. For example, it is assumed that the inclination amount of the vehicle 1 in the left-and-right direction (in the vehicle width direction) based on the detection results of the acceleration sensors 26 is, for example, 30°. Meanwhile, for example, it is assumed that the threshold value of the reference value stored in the ROM 30*a* is set as "off-road when the inclination amount is equal to or more than 20°." In this case, since the inclination of the detection results is equal to or more than the threshold value as a result of the comparison by the comparing unit 40, the switching unit 42 regards that the vehicle 1 is traveling on the off-road, and automatically switches the control of the display ECU 32, the engine ECU 34, the vehicle height adjustment ECU 36 and others from the first control mode for the on-road to the second control mode for the off-road. In addition, for example, it is assumed that the reference value stored in the ROM 30*a* is set as "off-road when the number of occurring times of a case where the inclination amount (the threshold value) becomes equal to or more than 20° is three times or more." In this case, when the number of occurring times (a value of the number of times) of the case where the detection results become equal to or more than the threshold value is three times or more (i.e., multiple times or more) within a predetermined time period (e.g., within five second traveling as a predetermined time or within 5 m traveling as a predetermined traveling distance) as a result of the comparison by the comparing unit 40, the switching unit 42 regards that the vehicle 1 is traveling on the off-road and automatically switches the control of the display ECU 32, the engine ECU 34, the vehicle height adjustment ECU 36 and others from the first control mode for the on-road to the second control mode for the off-road. In addition, the comparing unit 40 may determine whether to switch the first control mode to the second control mode, by comparing the inclination amount of the vehicle 1 in the front-and-rear direction based on the detection results of the acceleration sensors 26 and the reference value with each other.

The CPU 38 may read a program installed and stored in a nonvolatile memory device such as the ROM 30*a*, and implement the comparing unit 40 and the switching unit 42 according to the corresponding program. The RAM 30*b* temporarily stores various data used for the arithmetic operation in the CPU 38. In addition, the SSD 30*c* is a rewritable nonvolatile memory unit and may store data even when the power of the integrated ECU 30 is turned off. In addition, the CPU 38, the ROM 30*a*, the RAM 30*b* and others may be integrated in the same package. In addition, the integrated ECU 30 may be configured such that, instead of the CPU 38, another logic arithmetic processor such as a digital signal processor (DSP) or a logic circuit is used. In addition, instead of the SSD 30*c*, a hard disk drive (HDD) may be provided, and the SSD 30*c* or the HDD may be provided separately from the integrated ECU 30. In addition, the integrated ECU 30 may also perform a control for switching the second control mode (back) to the first control mode based on the detection results of the respective sensors.

The display ECU 32 includes a CPU 44 and a memory unit 46 (e.g., a ROM, RAM, or SSD). The CPU 44 reads a program installed and stored in the memory unit 46 and implements a module for a display processing according to the corresponding program. The CPU 44 of the display ECU 32 performs processings such as processing a surrounding image of the vehicle based on the captured image data obtained from the imaging units 15, processing various information (e.g., an inclinometer and a slip display meter to be described later) to be superimposed on the image, displaying various information on the display device 8, and displaying a navigation screen or an audio screen.

The engine ECU 34 includes a CPU 52 and a memory unit 54 (e.g., a ROM, RAM, or SSD). The CPU 52 reads a program installed and stored in the memory unit 54 and implements a module for the engine control according to the corresponding program. The CPU 52 of the engine ECU 34 performs processings such as determining an output of the engine unit 50, by determining a fuel injection amount or an intake air amount in the engine unit 50, an opening degree of an electronic throttle and others, based on the detection value of the accelerator sensor 20 and the detection values of the wheel speed sensors 22.

The vehicle height adjustment ECU 36 includes a CPU 60 and a memory unit 62 (e.g., a ROM, RAM, or SSD). The CPU 60 reads a program installed and stored in the memory unit 62 and implements a module for the vehicle height control processing according to the corresponding program. The CPU 60 of the vehicle height adjustment ECU 36 performs processings such as determining the expansion/contraction state of the absorber units 58, by determining a supply/discharge amount of the working fluid in the hydraulic controller 56, based on an input of an operation switch (not illustrated), a detection value of a weight sensor, the detection values of the vehicle height sensors 28 and others.

Descriptions will be made on the processing of switching between the first control mode and the second control mode by the traveling support system 100 configured as described above, using the exemplary display of the display device 8 in FIG. 4 and FIGS. 5 to 7.

Figure 4:
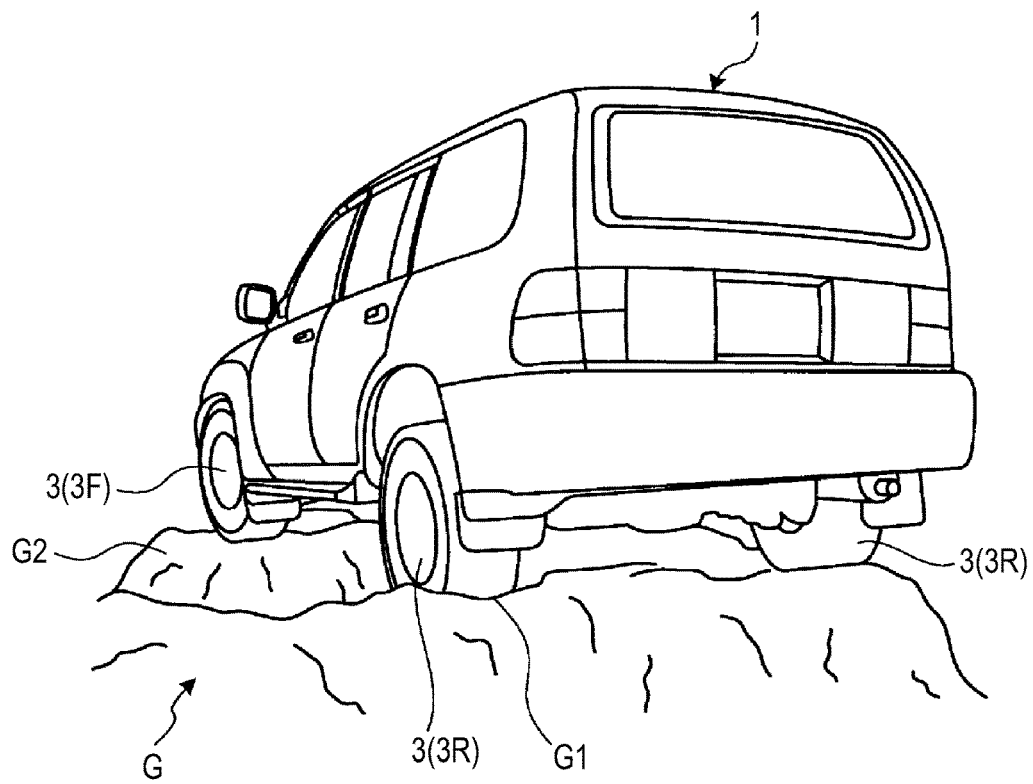
FIG. 4 is a perspective view illustrating a state where the vehicle equipped with the traveling support device according to the embodiment travels on an irregular ground road.

As described above, the comparing unit 40 of the integrated ECU 30 monitors the state of the vehicle 1 based on the detection values from the various sensors. For example, as illustrated in FIG. 4, when the vehicle 1 enters an off-road G, the posture of the vehicle 1 is inclined according to the state of the road surface, and the inclination in the front-and-rear direction and in the left-and-right direction is repeated as the traveling is continued. In the case of FIG. 4, the left rear wheel 3R falls into a dent G1, and the left front wheel 3F gets on a rock G2. In this case, the vehicle 1 has a posture in which the left front portion of the vehicle 1 is raised. When the vehicle 1 continues to travel, the left front wheel 3F goes down from the rock G2, and thus, the vehicle 1 has a posture in which the left front side of the vehicle 1 is lowered. At this time, for example, the acceleration sensors 26 (26*a* and 26*b*) output the acceleration frequently fluctuating in the front-and-rear direction and the left-andright direction as detection values. The CPU 38 may acquire the inclination amount of the vehicle 1 based on the acceleration detected by a well-known calculation method. As described above, the comparing unit 40 compares the calculated inclination amount with the reference value (the threshold value) stored in the ROM 30a and others, and when the calculated inclination amount is equal to or more than the reference value, the comparing unit 40 may determine that the vehicle 1 exists on the off-road (the vehicle 1 is traveling on the off-road). That is, the acceleration sensors 26 may function as inclination sensors that detect the state (the inclination amount) of the vehicle 1.

In addition, for example, the vehicle height sensors 28 (28a to 28d) outputs values of the vehicle height frequently fluctuating in the front-and-rear direction and the left-and-right direction as detection values. The CPU 38 may acquire the inclination amount of the vehicle 1 by detecting a height difference amount of the left and right wheels 3. The comparing unit 40 compares the calculated inclination amount with the reference value (the threshold value) stored in the ROM 30a and others, and when the calculated inclination amount is equal to or more than the reference value, it may be determined that the vehicle 1 exists on the off-load (the vehicle is traveling on the off-load). That is, the vehicle height sensors 28 may function as inclination sensors that detect the state (the inclination amount) of the vehicle 1. In addition, the ROM 30a may store the height difference amount of the front and rear and left and right wheels 3 as a comparison value, and compare the comparison value with the detection values of the vehicle height sensors 28 (28a to 28d).

In addition, since the ground contact balance of the respective wheels 3 of the vehicle 1 tends to easily collapse when the vehicle 1 travels on the off-road, the specific wheel 3, for example, the wheel 3 falling into the dent G1 may slip (idle). In this case, the wheel speed sensors 22 (22a to 22d) output the wheel speed of the slipping (idling) wheel 3 as a detection value of the wheel speed which is larger than those of the other wheels 3 that are not slipping (idling). That is, the CPU 38 may determine whether the vehicle 1 is in the slipping state, by detecting the difference in the wheel speeds of the wheels 3. The comparing unit 40 compares the calculated value that indicates the slipping state (e.g., a time duration of the slipping state or the number of occurring times of the slipping state within a unit time period) with the reference value (the threshold value) stored in the ROM 30a and others, and when the calculated value that indicates the slipping state is equal to or more than the reference value, it may be determined that the vehicle 1 exists on the off-road (the vehicle is traveling on the off-road). That is, the wheel speed sensors 22 may function as sensors that detect the state (the value indicating the slipping state) of the vehicle 1.

In addition, even though the inclination of the road surface is small, or the wheels 3 are not in the slipping (idling) state, when the road surface seems to cause the water submersion of the vehicle 1, the road surface may be regarded as the off-road. As described above, the plural distance measurement units 16 and 17 provided in the vehicle 1 may perform a detection of an obstacle or the like on the on-road. Meanwhile, upon the water crossing traveling, the distance measurement units 16 and 17 provided at the low positions of the vehicle 1 (e.g., on the bumpers) are submerged into water at a relatively early stage before reaching the height at which the water crossing traveling becomes impossible due to the water level (the height on which the water level limit line is superimposed). In this case, in the distance measurement units 16 and 17, the receiving state of the reflected waves becomes instable, and thus, operation errors occur. Accordingly, when the vehicle 1 enters the off-road such as a stream or marsh, and thus, the distance measurement units 16 and 17 are submerged into water, the plurality of distance measurement units 16 and 17 output error signals almost at the same time. The comparing unit 40 compares the number of the detected error signals with water submersion information stored in the ROM 30a and others such as the number and positions of the error signals output almost at the same time, and when the detected error signals meet the water submersion information (the reference value or the threshold value), it may be determined that the vehicle 1 exits on the off-road (in water) (the vehicle 1 is in the water crossing traveling).

When it may be regarded by the comparison result of the comparing unit 40 that the vehicle 1 exists on the off-road (the vehicle 1 is traveling on the off-road), the switching unit 42 switches the control of the vehicle 1 from the first control mode to the second control mode. For example, the switching unit 42 outputs a control signal to the CPU 44 of the display ECU 32 to switch the display of the display device 8.

As described above, in the comparison by the comparing unit 40, for example, when the inclination amount of the vehicle 1 in the left-and-right direction (the vehicle width direction) is equal to or more than the reference value (the threshold value) as a result of the detection based on the output values of the acceleration sensors 26, or when the height difference amount (the inclination amount) of the front and rear and left and right wheels 3 is equal to or more than the reference value (the threshold value) as a result of the detection of the output values of the vehicle height sensors 28, the first control mode may be immediately switched to the second control mode. In another embodiment, the comparing unit 40 may refer to a value of the number of occurring times (e.g., three times) of a case where the detection result is equal to or more than the threshold value within a predetermined time period (e.g., within five second traveling or within 5 m traveling), as the reference value, and when the number of occurring times of the case where the detection result is equal to or more than the threshold value is three times or more within the predetermined time period, the integrated ECU 30 (the switching unit 42) may switch the first control mode to the second control mode. In this case, it may be avoided that the first control mode is switched to the second control mode when the vehicle 1 is not actually traveling on the off-road, for example, in a case where the vehicle 1 is inclined or the vehicle height changes because the vehicle 1 runs on a curb stone or the like. That is, the switching unit 42 determiners that the vehicle 1 is traveling on the off-road when the state of the vehicle 1 changes with a predetermined frequency within a predetermined time period, for example, when a change occurs in the inclination amount of the vehicle 1 or the height difference amounts of the wheels 3 and performs the switching to the second control mode.

Similarly, in the comparison by the comparing unit 40, for example, when the value indicating the slipping state of the wheels 3 is equal to or more than the reference value (the threshold value) as a result of the comparison between the detection result based on the output values of the vehicle speed sensors 22 and the reference value (the threshold value), the first control mode may be immediately switched to the second control mode. In another embodiment, in the comparison by the comparing unit 40, when the number of occurring times of the case where the value indicating the slipping state of the wheels 3 becomes equal to or more than the threshold value is equal to or more than the value of the number of times (e.g., three times) within the predetermined time period (e.g., within five second traveling or within 5 m traveling), the ECU 30 (the switching unit 42) may switch the first control mode to the second control mode. In this case, it is avoided that the first control mode is switched to the second control mode when the vehicle 1 is not actually traveling on the off-road, for example, in a case where the vehicle 1 runs on small objects or the like on the road surface, and thus, the wheels 3 instantaneously slip. That is, the switching unit 42 determines that the vehicle 1 is traveling on the off-road when the vehicle 1 becomes the slipping state with a predetermined frequency within a predetermined time period, and performs the switching to the second control mode.

In addition, the "threshold value," the "predetermined time period," and the "value of the number of times" for the case where the vehicle 1 is regarded as being traveling on the off-road traveling, and the switching to the second control mode is performed may be appropriately set, and a control switching timing meeting the occupant's preference may be implemented.

Figure 5:
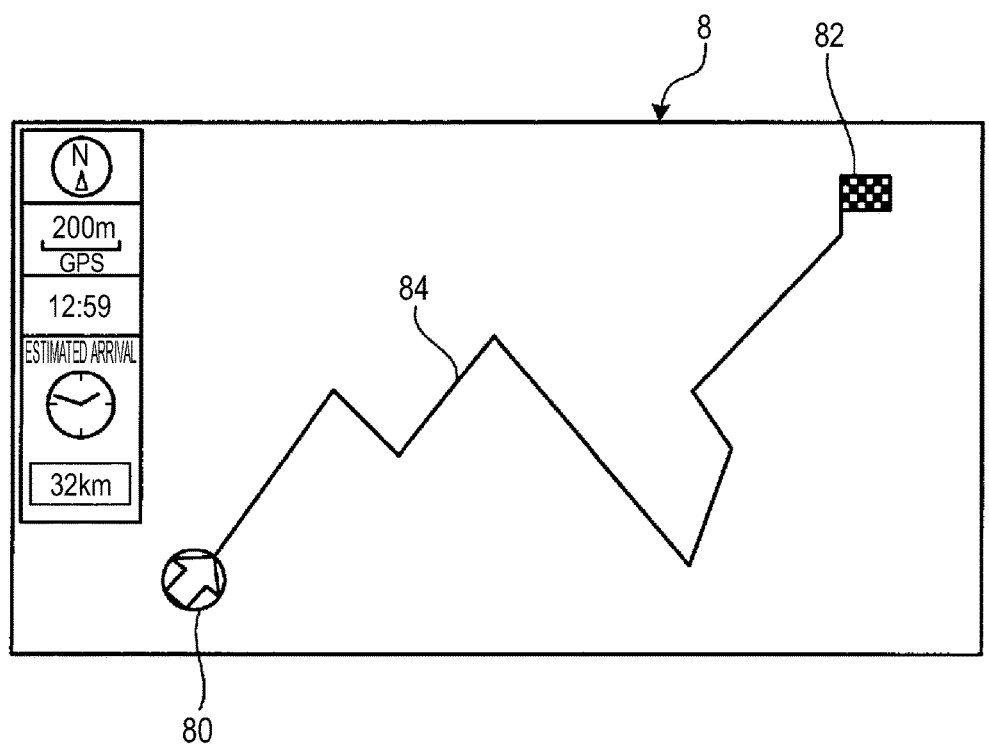
FIG. 5 is a view illustrating a display example of a display device in a first control mode of the vehicle equipped with the traveling support device according to the embodiment.

FIG. 5 illustrates a navigation screen as an exemplary display of the first control mode in the display device 8 controlled by the display ECU 32. FIG. 5 is an example where a recommended traveling route 84 that connects a car position mark 80 and a destination mark 82 to each other is displayed on the screen of the display device 8 to guide the vehicle 1 to the destination. That is, the display in FIG. 5 is an exemplary display suitable for the traveling on the on-road. The exemplary display suitable for the traveling on the on-road may be, for example, an audio screen.

Figure 6:
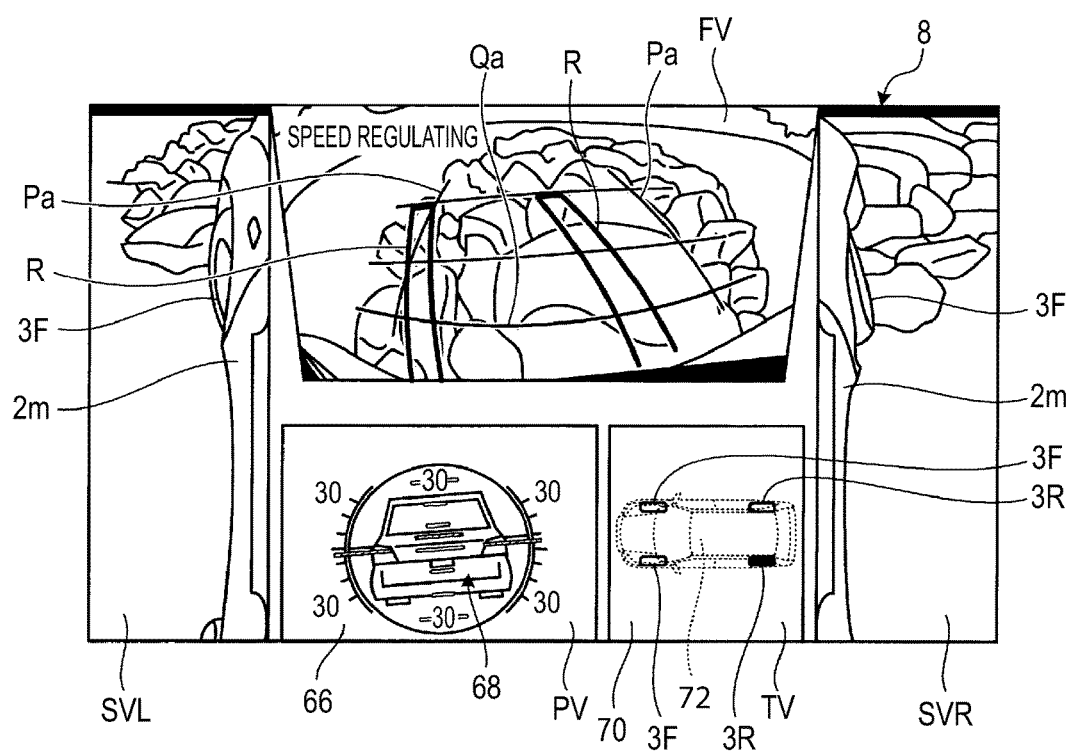
FIG. 6 is a view illustrating a display example of the display device in a second control mode of the vehicle equipped with the traveling support device according to the embodiment.

In FIG. 6, a screen including images of a periphery of the vehicle 1, a inclinometer 66, and a slip display meter 70 is displayed, as an exemplary display of the display device 8 in the second control mode which displays information indicating the state of the vehicle 1 for the off-road. In FIG. 6, the display area of the display device 8 is divided into plural areas to display images of various directions. In FIG. 6, a front side display area FV is arranged at, for example, the central upper portion of the display area of the display device 8, and a left side display area SVL and a right side display area SVR are arranged at the left and right sides of the display area. Further, in FIG. 6, a posture display area PV that displays the inclinometer 66 and a state display area TV that displays the slip display meter 70 are arranged below the front side display area FV. The front side display area FV may display a route indicator R indicating an estimated traveling direction of the vehicle 1, a front side reference line Qa indicating a rough distance from the end portion 2c of the front side of the vehicle body 2, lateral side reference lines Pa indicating rough distances from the ends portions 2d and 2f of the lateral sides of the vehicle body 2 and others, so as to implement the traveling support for enabling the traveling by selecting a portion of the road surface in a more appropriate state on the off-road. Here, the integrated ECU 30 may determine whether the vehicle 1 is traveling on the ground or in water, by the detection result (presence/absence of error signals) of the distance measurement units 16 and 17. Accordingly, the display ECU 32 may receive a signal indicating that the vehicle 1 is traveling on the ground, along with a signal for the switching to the second control mode from the switching unit 42, from the switching unit 42. In this case, the CPU 44 of the display ECU 32 displays images in which the display proportion of the road surface is larger than the display proportion of a body lateral surface 2m of the vehicle 1 in order to easily grasp the state of the road surface around the front wheels 3, in the left side display area SVL and the right side display area SVR. In addition, the inclinometer 66 displays the inclination of the vehicle 1 in the left-and-right direction (roll angle) or the inclination of the vehicle 1 in the front-and-rear direction (pitch angle) in a posture of a symbol 68, based on signals from the acceleration sensors 26 (26a and 26b).

In addition, the slip display meter 70 displays the slipping wheel 3 when the slipping (idling) wheel 3 exists, based on signals from the vehicle speed sensors 22 (22a to 22d). In the case of FIG. 6, the left and right front wheels 3F and the right rear wheel 3R of a vehicle icon 72 are not in the slipping (idling) state and are displayed, for example, in a semitransparent form. Meanwhile, the left rear wheel 3R is in the slipping (idling) state and is displayed, for example, in red.

Figure 7:
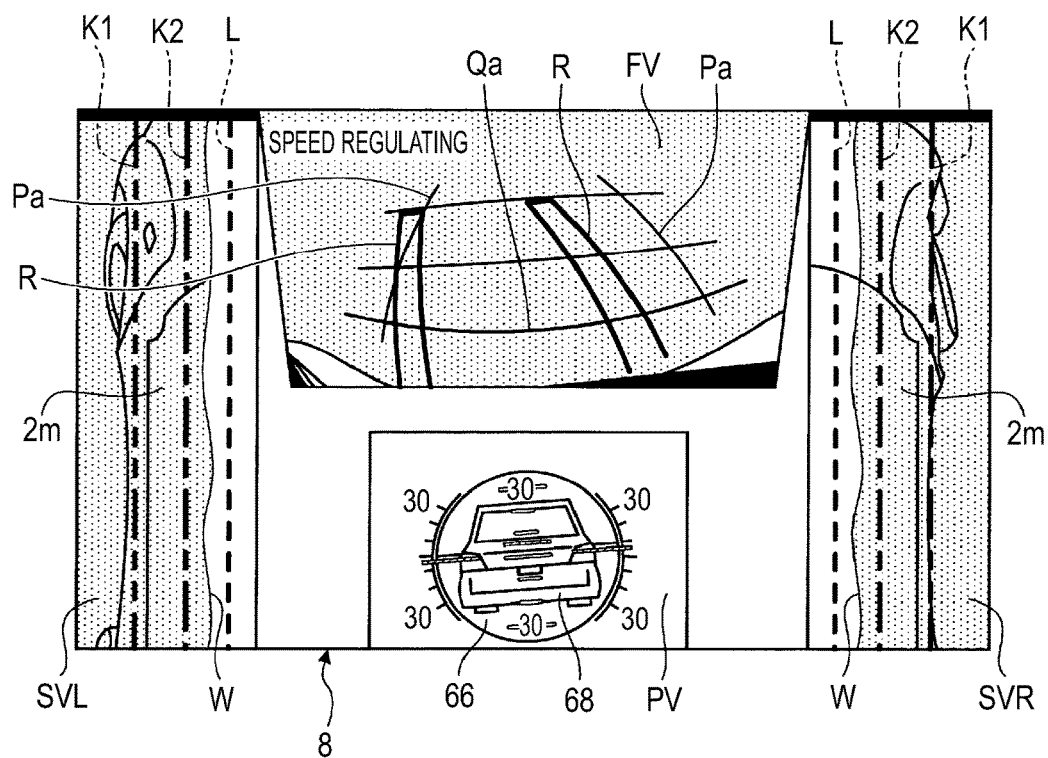
FIG. 7 is a view illustrating another display example of the display device in the second control mode of the vehicle equipped with the traveling support device according to the embodiment.

FIG. 7 is a view illustrating a state where the CPU 44 of the display ECU 32 switches the screen of the display device 8 to the screen of the second control mode, when it is regarded by the integrated ECU 30 that the vehicle 1 exists in water, that is, on the off-road (traveling on the off-road). As described above, since it may be determined according to the state of the error signals of the distance measurement units 16 and 17 that the vehicle 1 has shifted into the water crossing traveling state, the switching unit 42 of the integrated ECU 30 may cause the display ECU 32 to display a separate screen for the off-road.

In the case of FIG. 7, while the layout of the front side display area FV, the left side display area SVL, the right side display area SVR, and the posture display area PV is the same as the layout in FIG. 6, the internal layout of the left side display area SVL and the right side display area SVR is different from that in FIG. 6. As illustrated in FIG. 7, the left side display area SVL and the right side display area SVR display a "water level limit line L" and a "water level reference line K." The "water level limit line L" is an index line indicating the height at which the water crossing traveling becomes impossible, when the vehicle is in the water crossing traveling, and is superimposed on an actual image indicating the body lateral surface 2m of the vehicle 1. In addition, the "waver level reference line K" is an index line that is superimposed substantially in parallel with the water level limit line L without reaching the water level limit line L, and intended to previously notify the driver or the like of the rise of the water level. The "water level limit line L" is a line that indicates a height to which, for example, a waterproofing processing or a water cut-off processing is performed in the designing stage of the vehicle 1, and a height preset by the driving performance or the like of the vehicle 1, and is assigned to a position, for example, 600 mm upwardly apart from the ground contact surface of the wheels 3. In addition, when two water level reference lines are superimposed as the "water level reference line K," one of the two water level reference lines is superimposed as a "first water level reference line K1" on a position, for example, 400 mm downwardly apart from the "water level limit line L," that is, a position 200 mm upwardly apart from the ground contact surface of the wheels 3. The other is superimposed as a "second water level reference line K2" on a position, for example, 200 mm downwardly apart from the "water level limit line L," that is, a position 400 mm upwardly apart from the ground contact surface of the wheels 3. As described above, since the extent of the water level rise to the body lateral surface 2m may be gradually indicated by providing the "water level reference line K," the caution of the water level rise may be gradually performed. In addition, the presence/absence of the display of the "water level reference line K" may be selected by the driver or the like.

In the case of the screen of the second control mode in which the water level limit line L (the water level reference line K) is displayed, the area displaying the body lateral surface 2m in the images displayed in the left side display area SVL and the right side display area SVR is larger than that in the ground crossing traveling in which the water level limit line L (the water level reference line K) is not displayed. In the case of the water crossing traveling, to what extent the water surface W rises with respect to the water level limit line L (the water level reference line K) is mainly displayed. For this reason, the area displaying the body lateral surface 2m in the left side display area SVL and the right side display area SVR is increased. By changing the layout within the images, the visibility of the relationship between the water level limit line L (the water level reference line K) and the water surface W may be improved.

As described above, the traveling support system 100 detects the state of the vehicle 1, for example, the state of entering the off-road (an irregular ground road), and compares the reference value (the threshold value) with the inclination amount of the vehicle 1 in the vehicle width direction or the inclination amount of the vehicle 1 in the front-and-rear direction, the height difference amount of the wheels 3 of the vehicle 1 (e.g., the height difference amount of the left and right wheels, the height difference amount of the front and rear wheels, or the height difference amount of the front and rear and left and right wheels), the value indicating the slipping state of the wheels 3 and others, and when at least one of the items is equal to or more than the reference value (the threshold value), the traveling support system 100 automatically switches the control of the vehicle 1 to the second control mode suitable for the traveling on the off-road. In addition, in the traveling support system 100, it may also be determined whether the state of the vehicle 1 is in the ground crossing traveling or the water crossing traveling, and switching between the first control mode and the second control mode may be performed. As a result, when the vehicle 1 enters the off-road, the driver does not need to manually operate the switch or the like so that the driver hardly feels inconvenient, and furthermore, the driver may drive (operate) the vehicle 1 in the optimal state. In addition, as described above, the first control mode may be switched to the second control mode when the number of occurring times of the case where the detection result becomes equal to or more than the threshold value is a predetermined value or more (the value of the number of times; e.g., three times). In this case, the first control mode may be switched to the second control mode when the number of occurring times of the case where the same item, for example, the detection result of the inclination amount of the vehicle 1 in the vehicle width direction becomes equal to or more than the reference value (the threshold value) is a predetermined number of times (e.g., three times) or more within a predetermined time period. In another example, the first control mode may be switched to the second control mode when a sum of the number of occurring times of the case where plural different items, for example, the detection results of the inclination amount of the vehicle 1 in the vehicle width direction and the value indicating the slipping state become equal to or more than the threshold value is a predetermined number of times (e.g., three times) or more within a predetermined time period. In this case, the control mode is suppressed from being sensitively reactive to the state of the vehicle 1 to be switched to the second control mode, and in a case of a harsh off-road, when the state of the vehicle 1 changes in complex aspects, the control mode may be quickly switched to the second control mode.

In the descriptions above, the display mode has been described as the second control mode suitable for the traveling on the off-road. However, when the vehicle speed is high upon the traveling on the off-road (an irregular ground road), excessive shaking or impact may be applied to the vehicle 1 and the occupant, and cause damage of the vehicle 1 or discomfort to the occupant. Accordingly, in the present embodiment, when the integrated ECU 30 (the switching unit 42) determines to switch the control of the vehicle 1 to the second control mode, the speed of the corresponding vehicle 1 may be regulated to be lower than that of the first control mode by setting a limited speed value. For example, when the switching unit 42 determines to switch the control mode to the second control mode, the CPU 52 of the engine ECU 34 regulates the vehicle speed to a constant vehicle speed, for example, 10 km/h, by restricting the fuel injection amount or the intake air amount or by adjusting the opening degree of the electronic throttle, regardless of the detection value of the accelerator sensor 20, that is, regardless of the driver's power of stepping on the accelerator pedal. That is, the vehicle speed of the vehicle 1 is controlled within a range of 0 km/h to 10 km/h. By performing the vehicle speed regulation, the traveling of the vehicle 1 on the off-road may be more safely performed. In this case as well, the traveling support system 100 detects the state of the vehicle 1, for example, the state of entering the off-road (an irregular ground road), and automatically switches the control of the vehicle 1 to the second control mode suitable for the traveling on the off-road. As a result, when the vehicle 1 enters the off-road, the driver does not need to manually operate the switch or the like so that the driver hardly feels inconvenient, and furthermore, the driver may drive (operate) the vehicle 1 in the optimal state. In addition, when the vehicle speed regulation is performed by the engine ECU 34, the CPU 44 of the display ECU 32 may superimpose and display a message such as "Speed Regulating" on the display screen of the second control mode, for example, in the front side display area FV, as illustrated in FIG. 6. In addition, an audio message such as "Speed Regulating" may be output by using the audio output device 9. However, when the audio message is output, the output needs to be restricted to be performed about three times in order to avoid excessive notification.

Similarly, when the vehicle 1 travels on the off-road (an irregular ground road), in a case where the vehicle height is still suitable for the traveling on the on-road, that is, in a case where the vehicle height is still low, the bumpers or the bottom portion of the vehicle body may be highly likely to be in contact with the road surface, and a damage of the vehicle 1 may be caused, or the bottom portion of the vehicle body may ride over the rock or the like, and thus, the vehicle 1 is in the state of no more traveling (in a state where the wheels 3 are lifted off from the road surface). Accordingly, in the case of the present embodiment, when the integrated ECU 30 (the switching unit 42) determines to switch the control of the vehicle 1 to the second control mode, for example, when the height difference amount of the left and right wheels of the vehicle 1 becomes equal to or more than the reference value, the vehicle height may be made higher than the vehicle height in the first control mode. For example, when the switching unit 42 determines to switch the control of the vehicle 1 to the second control mode, the CPU 60 of the vehicle height adjustment ECU 36 ejects the working fluid from the hydraulic controller 56 to expand the absorber units 58 and increase the vehicle height of the vehicle 1 to the height suitable for the traveling on the off-road. By performing the vehicle height increasing control, the traveling of the vehicle 1 on the off-road may be more safely performed. In this case as well, the traveling support system 100 detects the state of the vehicle 1, for example, the state of entering the off-road (an irregular ground road), and automatically switches the control mode to the second control mode suitable for the traveling on the off-road. As a result, when the vehicle 1 enters the off-road, the driver does not need to manually operate the switch or the like so that the driver hardly feels inconvenient, and furthermore, the driver may drive (operate) the vehicle 1 in the optimal state. In addition, the increase amount of the vehicle height may be determined according to the inclination amount of the vehicle 1. In this case, it is avoided that the centroid of the vehicle 1 is unnecessarily raised, and thus, the performance of the traveling on the off-road may be improved in consideration of the balance maintenance of the vehicle 1. In this case as well, the CPU 44 of the display ECU 32 may superimpose and display a message such as "Vehicle Height Increasing" on the display screen of the second control mode of the display device 8. In addition, an audio message may be output. In addition, in the speed limiting or the vehicle height control as well, when the number of occurring times of the case where the detection result becomes equal to or more than the threshold value is a predetermined number of times (a value of the number of times) or more, the first control mode may be switched to the second control mode. Upon the switching to the second control mode, the display control, the speed control, and the vehicle height control may be switched to the second control mode at the same time, or an item to be switched may be selected by a user or the like. For example, only the display control and the vehicle speed control may be switched to the second control mode. In addition, the switching timing of the item to be switched may be changed through selection by a user. For example, when it is regarded that the vehicle has shifted to the traveling on the off-road, the display control is first switched to the second control mode, and when the traveling on the off-road is continued for a predetermined time period, the speed control is switched to the second control mode. And, when the traveling on the off-road is continued furthermore, the vehicle height control may be switched to the second control mode. In addition, the order of the switching may be appropriately changed.

In the above-described embodiment, the example where the acceleration sensors 26, the vehicle height sensors 28, the wheel speed sensors 22, the distance measurement units 16 and 17, and others are used as sensors for detecting the state of the vehicle 1 has been described. However, the embodiments disclosed here are not limited thereto. Other sensors may be appropriately used, and the identical effects may be obtained. For example, the inclination amount of the vehicle 1, the height difference amount, the occurrence/nonoccurrence of the waterway traveling and others may be detected by performing image analysis for the image from the image data imaged by the imaging units 15. In addition, the integrated ECU 30 may acquire the inclination amount according to the display state of the inclinometer 66. In addition, the integrated ECU 30 may acquire the inclination amount of the vehicle 1 by extracting the horizon from the image displayed on the display device 8.

In addition, the display ECU 32 may perform a view point conversion processing or the like for the captured image data, and cause the display device 8 to display a bird's eye view image from which the surrounding circumstances of the vehicle 1 may be easily grasped, as the image of the second control mode. In addition, when the wheels 3 are in the slipping (idling) state, the display ECU 32 may perform the view point conversion processing or the like for the captured image data, and cause the display device 8 to display an image from which the wheels 3 in the slipping state may be more easily recognized.

Although embodiments and modifications disclosed here have been described, these embodiments and modifications are exemplary only, but are not intended to limit the scope of the disclosure. These novel embodiments may be implemented in other various forms, and various omissions, substitutions, and changes may be made without departing from the gist of the disclosure. These embodiments and modifications thereof are included in the scope or gist of the disclosure, and included in the disclosure described in claims and the equivalent scope thereof.

A traveling support device according to an aspect of this disclosure includes: a comparing unit that compares a detection result based on an output value output from a sensor for detecting a state of a vehicle with a reference value stored in advance; and a controller that, when comparison by the comparing unit determines that the detection result is equal to or more than the reference value, switches a first control mode to a second control mode different from the first control mode with respect to at least one of a display control capable of switching display of information on the vehicle, a vehicle height control capable of switching a vehicle height with a vehicle height adjustment device of the vehicle, and a vehicle speed control capable of switching a speed limit value with a vehicle speed control device of the vehicle. According to this configuration, when the state of the vehicle, for example, entry into an irregular ground road is detected, the detection result is compared with the reference value so as to automatically switch at least one of the display control, the vehicle height control, and the vehicle speed control. As a result, even when the traveling state changes, the vehicle may travel in an appropriate control mode without causing a driver or the like to feel inconvenient with the mode switching.

In the above-described traveling support device, for example, the sensor may include an inclination sensor that detects an inclination amount of the vehicle. According to this configuration, for example, when the inclination amount of the vehicle becomes equal to or more than the reference value, the mode of the vehicle is automatically switched to the control for enabling the vehicle to safely travel. Thus, a support for improving the traveling safety may be implemented without causing the driver to feel inconvenient with the mode switching.

In the above-described traveling support device, for example, the sensor may include a sensor that detects a value indicating a slipping state of wheels of the vehicle. According to this configuration, for example, when the value indicating the slipping state (e.g., a time duration of the slipping state or the number of occurring times of the slipping state within a unit time period) becomes equal to or more than the reference value, the mode of the vehicle is automatically switched to the control for enabling the vehicle to safely travel. Thus, a support for improving the traveling safety may be implemented without causing the driver to feel inconvenient with the mode switching.

In the above-described traveling support device, for example, the sensor may include a sensor that detects a height difference amount of the wheels of the vehicle. According to this configuration, for example, when the height difference amount of the front and rear and right and left wheels becomes equal to or more than the reference value, the mode of the vehicle is automatically switched to the control for enabling the vehicle to safely travel. Thus, a support for improving the traveling safety may be implemented without causing the driver to feel inconvenient with the mode switching.

In the above-described traveling support device, for example, the controller may display information indicating the state of the vehicle for an off-road, as the second control mode of the display control. According to this configuration, for example, when the detection result of the sensor becomes equal to or more than the reference value, it is regarded that the vehicle enters the off-road (an irregular ground road), and a screen of the first control mode such as a route guiding screen or an audio screen displayed when the vehicle travels on an on-road (an regular ground road) such as the road surface of a city is automatically switched to the second control mode displaying information useful when the vehicle travels on the off-road. As a result, a traveling support for providing information necessary for the off-road traveling may be implemented without causing the driver to feel inconvenient with the mode switching.

In the above-described traveling support device, for example, the controller may display inclination information of the vehicle as information indicating the state of the vehicle for the off-road. According to this configuration, since the posture of the vehicle which is useful for the off-road traveling is automatically displayed, a traveling support for further improving the sense of safety during the off-road traveling may be implemented.

In the above-described traveling support device, for example, the controller may increase a vehicle height of the vehicle to be higher than that of the first control mode by the vehicle height adjustment device, as the second control mode of the vehicle height control. According to this configuration, for example, when the detection result of the sensor becomes equal to or more than the reference value, it is regarded that the vehicle enters the off-road, and the vehicle height of the first control mode which is suitable for the on-road traveling is automatically switched to the vehicle height of the second control mode which is suitable for the off-road traveling. As a result, a traveling support for enabling the vehicle to travel with an appropriate vehicle height according to the state of the road surface may be implemented without causing the driver to feel inconvenient with the mode switching.

In the above-described traveling support device, for example, the controller may set a speed limit value for the speed of the vehicle to be lower than that of the first control mode, by the vehicle speed control device. According to this configuration, for example, when the detection result of the sensor becomes equal to or more than the reference value, it is regarded that the vehicle enters the off-road, and the mode of the vehicle is automatically switched to the mode for setting the speed limit value to be lower than that for the on-road traveling so as to enable the vehicle to safely travel on the off-road. As a result, a traveling support for enabling the vehicle to travel at an appropriate speed according to the state of the road surface may be implemented without causing the driver to feel inconvenient with the mode switching and without exceeding a required speed.

In the above-described traveling support device, for example, the comparing unit may refer, as the reference value, to a threshold value to be compared with the detection result, and when the detection result is equal to or more than the threshold value, the controller may switch the first control mode to the second control mode. According to this configuration, for example, when the state of the vehicle changes, for example, when the vehicle enters the off-road, the switching to the second control mode may be quickly performed.

In the above-described traveling support device, for example, the comparing unit may refer, as the reference value, to a value of the number of times that a value becomes equal to or more than a predetermined threshold value within a predetermined time period, and when the detection result is equal to or more than the value of the number of times within the predetermined time period, the controller may switch the first control mode to the second control mode. According to this configuration, it is avoided that the switching to the second control mode is easily performed when the state of the vehicle instantaneously changes due to a slight change of the road surface, for example, when the vehicle runs on small objects or the like on the road surface without actually entering the off-road or the like so that the state of the vehicle instantaneously changes.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A traveling support device comprising:
a processor configured to
compare a detection result based on an output value output from a sensor for detecting a state of a vehicle with a reference value stored in advance;
switch a display of information on the vehicle from a first control mode to a second control mode different from the first control mode;
switch a vehicle height with a vehicle height adjustment device of the vehicle from the first control mode to the second control mode different from the first control mode;
switch a speed limit value with a vehicle control device of the vehicle from the first control mode to the second control mode different from the first control mode; and
when the detection result is equal to or more than the reference value, switch at least one of the display of information on the vehicle, the vehicle height, or the speed limit value from the first mode to the second mode.

2. The traveling support device according to claim 1, wherein the sensor includes an inclination sensor that detects an inclination amount of the vehicle.

3. The traveling support device according to claim 1, wherein the sensor includes a sensor that detects a value indicating a slipping state of wheels of the vehicle.

4. The traveling support device according to claim 1, wherein the sensor includes a sensor that detects a height difference amount of the wheels of the vehicle.

5. The traveling support device according to claim 1, wherein information indicating the state of the vehicle for an off-road is displayed as the second control mode of the display control.

6. The traveling support device according to claim 5, wherein inclination information of the vehicle is displayed as information indicating the state of the vehicle for the off-road.

7. The traveling support device according to claim 1, wherein a vehicle height of the vehicle is increased to be higher than that of the first control mode by the vehicle height adjustment device, as the second control mode of the vehicle height control.

8. The traveling support device according to claim 1, wherein a speed limit value for the speed of the vehicle is set to be lower than that of the first control mode, by the vehicle speed control device as the second control mode of the vehicle speed control.

9. The traveling support device according to claim 1, wherein the reference value is a threshold value to be compared with the detection result, and when the detection result is equal to or more than the threshold value, the first control mode is switched to the second control mode.

10. The traveling support device according to claim 1, wherein the reference value is a value of number of times that a value becomes equal to or more than a predetermined threshold value within a predetermined time period, and when the detection result is equal to or more than the value of the number of times within the predetermined time period, the first control mode is switched to the second control mode.

11. The traveling support device according to claim 1, wherein when the at least one of the display of information on the vehicle, the vehicle height, or the speed limit value has been switched from the first mode to the second mode for a predetermined time period, the processor is further configured to switch another of the display of information on the vehicle, the vehicle height with a vehicle height adjustment device of the vehicle, or the speed limit value from the first mode to the second mode.

12. The traveling support device according to claim 11, wherein when the other of the display of information on the vehicle, the vehicle height, or the speed limit value has been switched from the first mode to the second mode and the second mode is further continued, the processor is further configured to switch a third of the display of information on the vehicle, the vehicle height, or the speed limit value from the first mode to the second mode.

13. The traveling support device according to claim 1, wherein the processor is configured to allow a user to select which of the display of information on the vehicle, the vehicle height, and the speed limit value is switched from the first mode to the second mode when the detection result is equal to or more than the reference value.

14. The traveling support device according to claim 1, wherein when the detection result is equal to or more than the reference value, the processor is configured to switch the display of information on the vehicle, the vehicle height, and the speed limit value from the first mode to the second mode.

* * * * *